United States Patent
Terai

(10) Patent No.: US 8,625,400 B1
(45) Date of Patent: Jan. 7, 2014

(54) MULTITRACK RECORDER

(71) Applicant: TEAC Corporation, Tama (JP)

(72) Inventor: Shota Terai, Kawasaki (JP)

(73) Assignee: TEAC Corporation, Tama-shi, Tokyo (JP)

( * ) Notice: Subject to any disclaimer, the term of this patent is extended or adjusted under 35 U.S.C. 154(b) by 0 days.

(21) Appl. No.: 13/749,513

(22) Filed: Jan. 24, 2013

(30) Foreign Application Priority Data

Aug. 23, 2012 (JP) ................................. 2012-184375

(51) Int. Cl.
*G11B 7/20* (2006.01)

(52) U.S. Cl.
USPC ............................................. 369/95; 369/92

(58) Field of Classification Search
USPC ....................................... 369/92, 95
See application file for complete search history.

(56) References Cited

U.S. PATENT DOCUMENTS

| | | | | |
|---|---|---|---|---|
| 4,623,992 A | * | 11/1986 | Kurosaki et al. | 369/6 |
| 6,208,800 B1 | * | 3/2001 | Katsuyama et al. | 386/291 |
| 2013/0073933 A1 | * | 3/2013 | Eppolito | 715/202 |

FOREIGN PATENT DOCUMENTS

JP     2002208258 A     7/2002

* cited by examiner

*Primary Examiner* — Brenda Bernardi
(74) *Attorney, Agent, or Firm* — Seed IP Law Group PLLC

(57) ABSTRACT

A multitrack recorder easily, reliably performs processing for replicating a sound signal recorded in a certain track to another track. A multitrack recorder can set tracks 3 and 4, among a plurality of tracks 1 through 4, to either a monaural track type or a stereo track type. The track types are stored in memory. When a sound signal recorded in a source track is recorded in a replicated manner to a destination track, tracks conforming to a track type of a source track are automatically presented on a display section as possible destination tracks by use of the track types stored in the memory.

4 Claims, 4 Drawing Sheets

| SOURCE TR | DESTINATION TR |
|---|---|
| 1 | 2 |
|   | 4 |
| 2 | 1 |
|   | 4 |
| 3 | 1/2 |
| 4 | 1 |
|   | 2 |
| 1/2 | 3 |

FIG. 7

| SOURCE TR | DESTINATION TR |
|---|---|
| 1 | 2 |
| 2 | 1 |
| 3 | 4 |
|   | 1/2 |
| 4 | 3 |
|   | 1/2 |
| 1/2 | 3 |
|   | 4 |

FIG. 8

MULTITRACK RECORDER

PRIORITY INFORMATION

This application claims priority to Japanese Patent Application No. 2012-184375, filed on Aug. 23, 2012, which is incorporated herein by reference in its entirety.

TECHNICAL FIELD

The invention relates to a multitrack recorder that records a sound signal in a plurality of tracks.

BACKGROUND ART

A hitherto-known multitrack recorder records a sound signal into a plurality of tracks. A multitrack recorder makes it possible to record a rhythm guitar part in a track 1 and a lead guitar part in a track 2 by use of; for instance, an electric guitar and a vocal sound in a track 3 by use of a built-in microphone and mix down them to thereby generate and record a stereo signal.

It is desirable that the multitrack recorder be able to record a sound signal in as many tracks as possible. In the meantime, when an attempt is made to make the multitrack recorder compact in consideration of portability, limiting the number of tracks might be unavoidable. Measures that are conceivable in the circumstances are to limit the number of tracks to a certain number; for instance, four and make some of the tracks assignable to either a monaural type or a stereo type rather than fixing the tracks solely to monaural types to enhance user's convenience.

A magneto-optical disc editor described in JP 2002-208258 A is not directed toward a multitrack recorder but intended to enable simple edition of data recorded in a recording medium in conformance with a recording mode. The magneto-optical disc editor is configured so as to display an edit function in a selectable manner by switching a window on a display section when a recording mode is selected.

In the case of the configuration that enables limiting the number of tracks to a certain number and makes some of the tracks assignable to either a monaural type or a stereo type, user's operability could be deteriorated depending on processing.

For instance, in a case where a sound signal recorded in a certain track is replicated (copied) to another track, if a source track is a monaural type and a monaural signal is recorded, a destination track should also be a monaural type. If a destination track desired by the user is set to a stereo type rather than to a monaural type, the sound signal cannot be replicated, which will embarrass the user. No problem will arise, as long as the user accurately takes hold of which tracks are of a monaural type or a stereo type. However, an additional burden will be imposed on the user. It will also be troublesome for the user to check which tracks are monaural types and which tracks are of a stereo type on a dedicated screen, or the like, every time a sound signal is copied.

SUMMARY

The invention easily, reliably puts into practice processing for replicating a sound signal recorded in a certain track to another track in a multitrack recorder that enables assigning at least some of a plurality of tracks to a monaural type or a stereo type.

The invention provides a multitrack recorder that records sound signals into a plurality of tracks and that is characterized by comprising: setting means capable of setting at least any of the plurality of tracks to either a monaural track type or a stereo track type; storage means that stores the track type set by the setting means; and control means that records the sound signal recorded in a source track to a destination track in a replicating manner and that presents a track conforming to the track type of a source track as a possible destination track by use of the track types stored in the storage means.

In one embodiment of the invention, the control means is characterized by presenting a monaural track as a possible destination track when the source track is a monaural track and presenting a stereo track or a pair of monaural tracks as a possible destination track when the source track is a stereo track.

In another embodiment of the invention, the control means presents a stereo track or a pair of monaural tracks as a possible destination track when the source track is a pair of monaural tracks.

According to the invention, a track conforming to a track type of a source track is automatically presented as a possible destination track. Hence, a user can easily, reliably realize processing for replicating a sound signal recorded in a certain track to another track, which results in enhancement of operability and lessening of a burden on the user.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein:

FIG. 7 is a descriptive view showing combinations of source tracks with destination tracks; and FIG. 8 is a descriptive view showing combinations of the source tracks with the destination tracks.

DETAILED DESCRIPTION

An embodiment of the invention is hereunder described by reference to the drawings.

Figure 1:
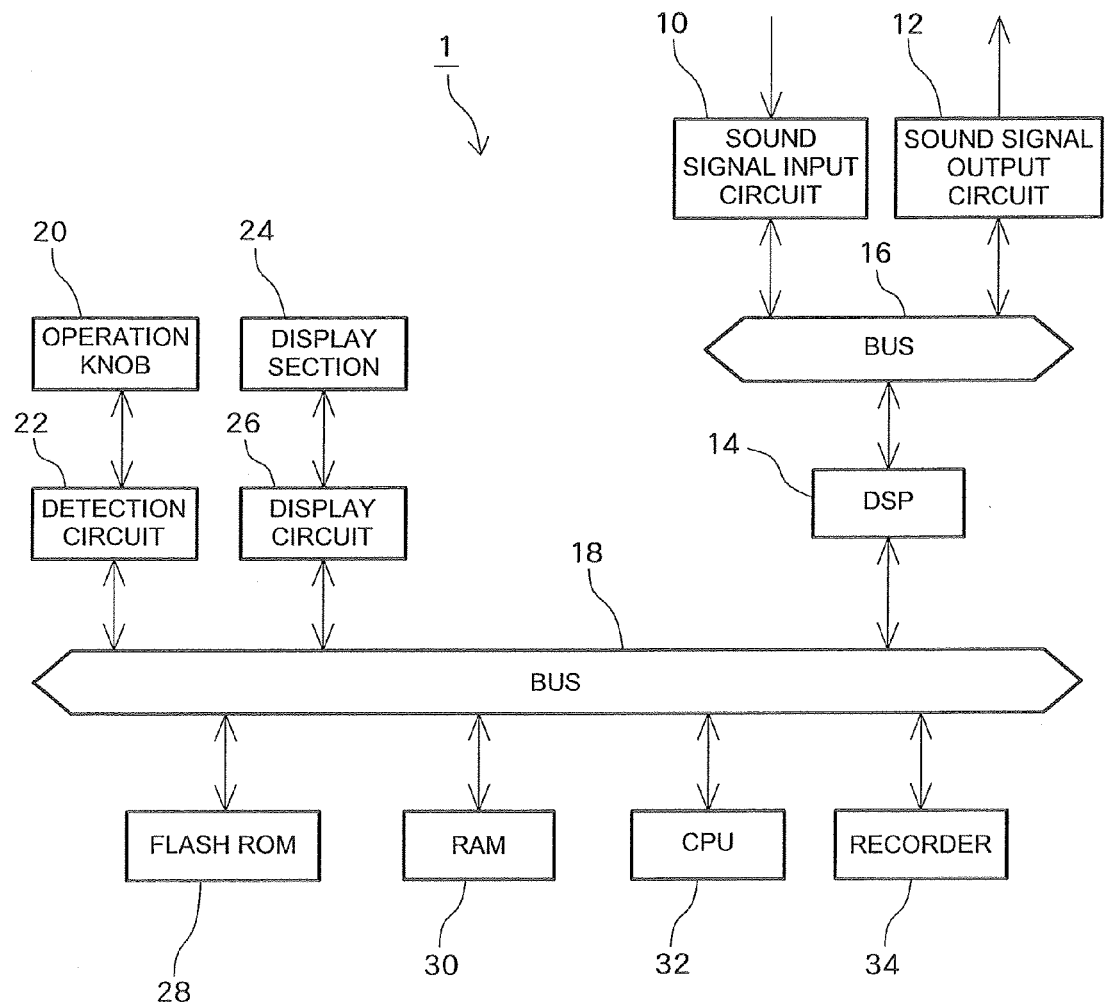
FIG. 1 is a block diagram of a multitrack recorder of an embodiment.

FIG. 1 is a block diagram of a multitrack recorder 1 of the embodiment. A sound signal input circuit 10 has a plurality of input ports and is provided with inputs of sound signals from a plurality of sound generators (sources). Exemplifications of the plurality of sound signals include a guitar sound, a vocal sound, a drum sound, and the like. In the embodiment, the sound signal input circuit 10 has two built-in microphones and two input ports and is provided with inputs of sound signals. The built-in microphones and the input ports are switchable. A sound signal input by way of the sound signal input circuit 10 is fed to a DSP (Digital Signal Processor) 14 by way of a bus 16.

Under control of a CPU 32, the DSP 14 subjects sound signals of a plurality of channels, which are fed from the sound signal input circuit 10, to various digital processing; for instance, effect processing, equalizing, or mixing, and are recorded in the recorder 34 by way of the bus 18. A recording medium of the recorder 34 is an optical disc, including a CD-R/RW and a DVD-R/RW, a hard disc drive, a flash memory medium, and the like. Processing of the DSP 14 also includes processing for controlling PAN and a volume level of each of the sound signals according to manipulation of operation knobs 20.

The operation knobs 20 are disposed on an operation surface of the multitrack recorder 1. The operation knobs 20 are made up of various key switches, a selection button, a menu button, a determination button, a PAN knob, a level knob, and others. The user assigns an individual sound signal to at least one track of a plurality of tracks by manipulating the operation knobs 20. A detection circuit 22 detects a state of manipulation of the operation knobs 20. The detection circuit 22 supplies a manipulation status detection signal pertaining to the operation knobs 20 to the CPU 32 by way of the bus 18.

The CPU 32 collectively controls an entirety of the multitrack recorder. According to a program stored in flash ROM 28, the CPU 32 performs various processing by use of RAM 30 serving as working memory. Specifically, respective sound signals of a plurality of channels are assigned to at least any of the plurality of tracks according to the operation status detection signal from the detection circuit 22. For instance, when there are tracks from a track 1 to a track 4, a channel A is assigned to the track 1; a channel B is assigned to the track 2; and a channel C is assigned to the track 4. In the embodiment, a correlation between channels and tracks resulting from assignment of the respective channels to the respective tracks is referred to as "assignment information." The CPU 32 supplies various information to a display circuit 26. The display circuit 26 displays various information on a display section 24.

The CPU 32 commands the display circuit 26 to display a variety of menu screens and a setting screen in compliance with user's manipulation of the operation knobs 20. According to information from the CPU 32, the display circuit 26 displays the menu screen and the setting screen on the display section 24. The menu screens include one for assigning each of the tracks 1 through 4 to either a monaural type or a stereo type. In the embodiment, at least any of the tracks 1 through 4 is configured so as to be selectable between a monaural type and a stereo type. The user sets a desired track to either a monaural type or a stereo type. In the multitrack recorder of the embodiment, the track 1 and the track 2 are set to monaural types, and the track 3 and the track 4 can be set to either a monaural type or a stereo type. The setting screen includes one for replicating (cloning or copying) the sound signal recorded in a certain track to another track. The user manipulates the operation knobs 20 on the setting screen, thereby selecting a source track and a destination track.

The CPU 32 commands the display circuit 26 to display a level of the sound signal assigned to each of the tracks in the form of a bar chart (a level meter), and the display circuit 26 displays a level meter image on the display section 24 in accordance with information from the CPU 32.

Moreover, the CPU 32 reads a sound signal recorded in the recorder 34 in conformance with the operation status detection signal from the detection circuit 22 and feeds the signal to the DSP 14. The DSP 14 outputs a sound signal to the outside by way of the bus and the sound signal output circuit 12. The sound output circuit 12 has various output ports, such as an analogue output port and a digital output port.

Figure 2:
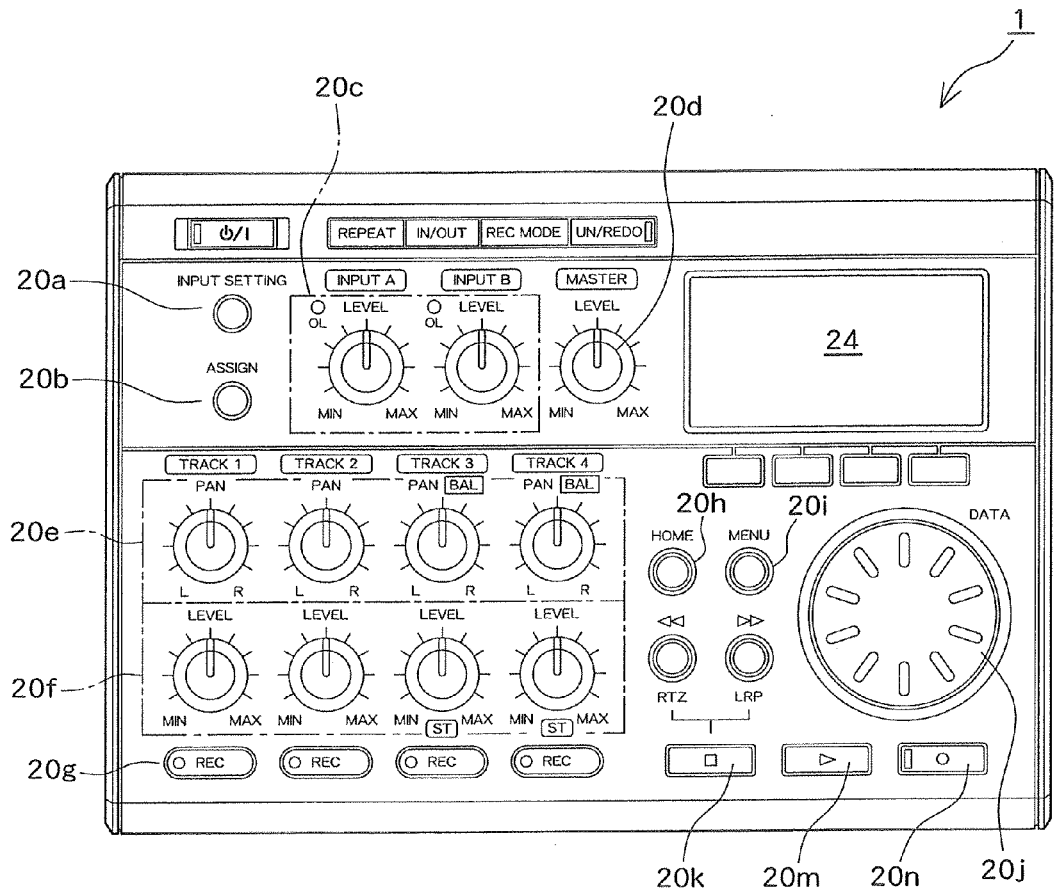
FIG. 2 is a plan view of the multitrack recorder of the embodiment.
Figure 3:
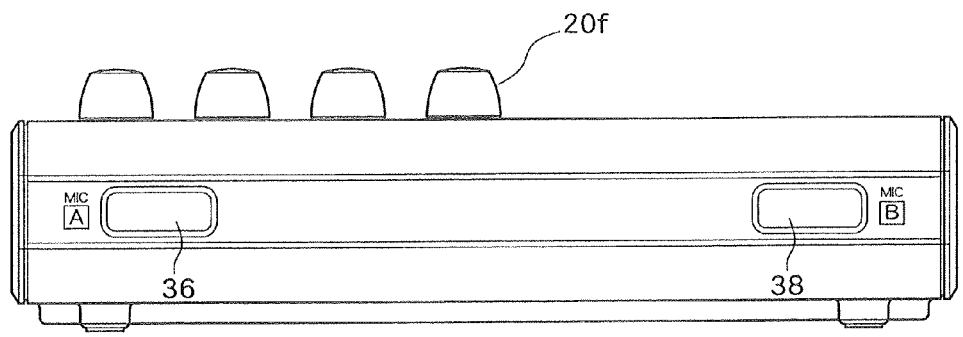
FIG. 3 is a front view of the multitrack recorder of the embodiment.
Figure 4:
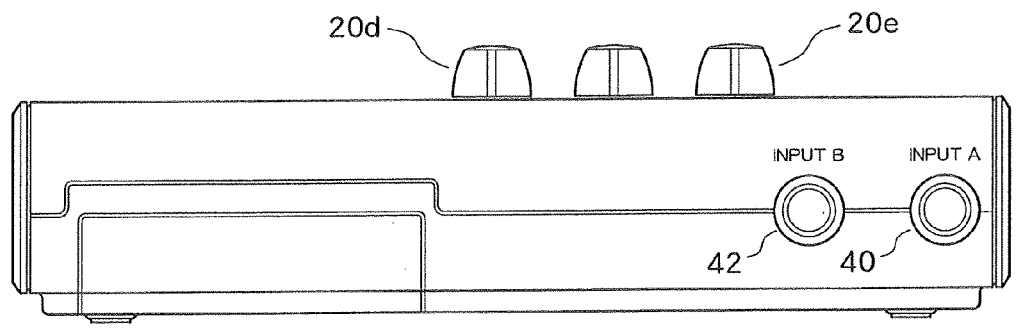
FIG. 4 is a rear view of the multitrack recorder of the embodiment.

FIG. 2 shows a plan view of the multitrack recorder 1 of the embodiment. FIGS. 3 and 4 show a front view and a rear view of the multitrack recorder, respectively.

The operation surface of the multitrack recorder 1 is provided with the variety of operation knobs 20 and the display section 24. The operation knobs 20 include an input setting key 20a, an assign key 20b, an input channel level knob 20c, a master level knob 20d, a PAN knob 20e, a level knob 20f, a recording function key 20g, a home key 20h, a menu key 20i, a data wheel 20j, a stop key 20k, a playback key 20m, and a record key 20n.

The input setting key 20a is one for selecting an input source. The user performs switching whether to use a built-in microphone or an input port as an input source, by manipulating the key.

The assign key 20b is one for assigning an input sound signal to each of the tracks 1 through 4. The user manipulates the key, to thus assign and record a sound signal to each track.

The input channel level knob 20c is one for controlling a level of each of the input sources. The user controls a level of each of the input sources by manipulating the knob. For instance, when the input source is set to a built-in microphone, a level of a sound signal input from the built-in microphone is controlled by use of the knob.

The master level knob 20d is one for controlling a monitor level of a stereo output signal.

The PAN knob 20e is one provided for each of the track 1 to the track 4 and controlling a normal position (PAN) for stereo mix of the sound signal of each of the tracks.

The level knob 20f is provided for each of the track 1 to the track 4 and controlling a level of a sound signal of each of the tracks.

The recording function key 20g is provided for each of the track 1 to the track 4. A track of interest shifts to a record standby state by user's manipulation of the recording function key 20g. When the playback key 20m and the record key 20n are manipulated in the record standby state, a sound signal is recorded in the track that is in the record standby state.

The home key 20h is one for displaying a home screen on the display section 24. The home screen is a basic screen of the multitrack recorder 1 and appears immediately after power of the multitrack recorder 1 is turned on. When the home key 20h is manipulated in the middle of appearance of another screen, the home screen is displayed on the display section 24. The home screen displays a recorder motor and its power status, a transport status of the recorder, a time counter of the recorder, a status and a level meter of each of the tracks 1 to 4, stereo output level meters, and others.

The menu key 20i is one for displaying a menu screen on the display section 24. The menu screen includes information, track edition, a data backup, a tuner, and others. The track edition includes a clone track, cleanout, silence, a cut, open, and others. The clone track is a menu for replicating a track, and cleanout is a menu for deleting a track. Silence is a menu for partially deleting a track. Cut is a menu for partially deleting a track. Open is a menu for inserting silence.

The data wheel 20j is one for changing a value of each of the parameters or selecting an item by means of menu manipulation.

In the meantime, as shown in the front view of FIG. 3, built-in microphones 36 and 38 are disposed on both sides of the front of the multitrack recorder 1. The built-in microphones 36 and 38 are usually used as right and left microphones; namely, the built-in microphone 36 for an L channel and the built-in microphone 38 for an R channel, during stereo recording operation. However, use of the built-in microphones 36 and 38 is not limited to the way mentioned above. Only either the built-in microphone 36 or the built-in microphone 38 can be used. Alternatively, the built-in microphone 36 can be used for an R channel, and the built-in microphone 38 can be used for an L channel. Levels of the sound signals input from the built-in microphones 36 and 38 are controlled by means of the input channel level knob 20c.

Moreover, as shown in a rear view of FIG. 4, input ports 40 and 42 are provided on a rear surface of the multitrack recorder 1. Levels of sound signals input by way of the input ports 40 and 42 are likewise controlled with the input channel level knob 20c.

The user can select a desired channel and a desired track by use of the operation knobs 20 and assign a sound signal to a desired track. For instance, the input port 40 is selected as a channel A, and a guitar sound signal is input. The input port 42 is selected as a channel B, and a drum sound signal is input. Assignment is set as follows by use of the assign key 20b.

Channel A (a guitar sound signal)—Track 1
Channel B (a drum)—Track 2

Assignment information is stored in the RAM 30. The user sets the track 3 and the track 4 by switching them to a monaural type or a stereo type, by use of the operation knobs 20. For instance, the following are set:

Track 3—stereo
Track 4—monaural

Specifically, each of the track 3 and the track 4 is made up of two channels. When the track is set to a monaural type, only one of the two channels is enabled. In contrast, when the track is set to a stereo type, both of the two channels are enabled and set as an L channel and an R channel. Accordingly, when the track 3 is set to a stereo type, an L channel sound signal and an R channel sound signal are recorded in the track 3.

Setting each of the tracks 3 and 4 to either a monaural type or a stereo type and track edition in the embodiment are now described specifically.

Figure 5:
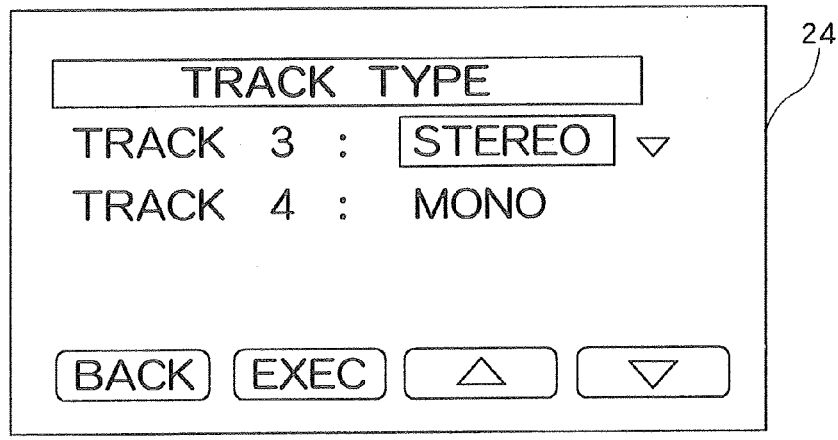
FIG. 5 is a descriptive view showing a setting screen of a track type.

FIG. 5 shows an exemplification of a screen that appears on the display section 24 when the user selects a track type by manipulating the menu key 20i and the data wheel 20j. In response to manipulation of the menu key 20i and the data wheel 20j, the CPU 32 displays on the display section 24 a setting screen as to whether to set the track 3 and the track 4 to a monaural type or a stereo type. Alternatives, or monaural and stereo, for the respective tracks 3 and 4 are displayed on the screen. The user manipulates the data wheel 20j, to thus make a choice. FIG. 5 shows a case where the user sets the track 3 to a stereo type and the track 4 to a monaural type. Type information about the track 3 and the track 4 is stored in the RAM 30. Since the track 1 and the track 2 are fixed to a monaural type, information about their types does not need to be stored in the RAM 30. However, information about types of all the tracks 1 through 4 can also be collectively stored in the RAM 30 as a table. A monaural identifier is taken as M, and a stereo identifier is taken as S.

Track 1: M
Track 2: M
Track 3: S
Track 4: M

Figure 6:
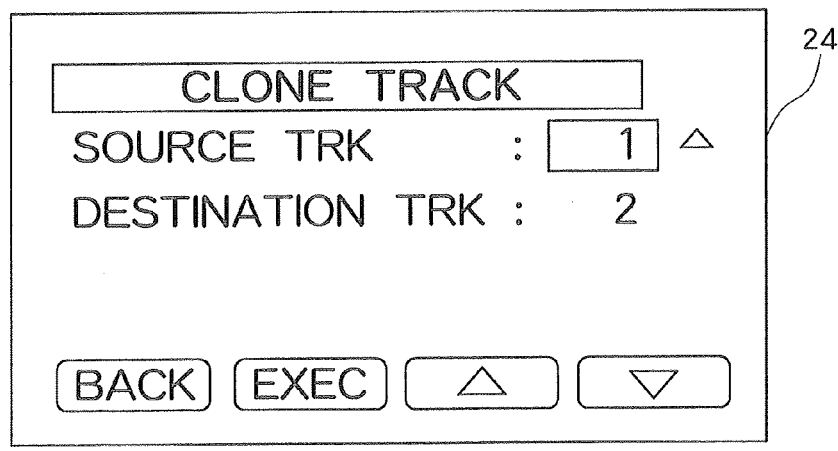
FIG. 6 is a descriptive view showing a screen for selecting a source track and a destination track at the time of replication (copying or cloning) of a track.

FIG. 6 shows an exemplification of a screen appearing on the display section 24 when the user selects track edition by manipulating the menu key 20i and also selects a clone track by manipulating the data wheel 20j. In response to manipulation of the menu key 20i and the data wheel 20j, the CPU 32 displays on the display section 24 a screen for setting a source track (SOURCE TRK) and a destination track (DESTINATION TRK). The screen shows alternatives pertaining to the source track and the destination track. The user selects a desired source track and a desired destination track.

The CPU 32 automatically displays, on this occasion, only selectable alternatives according to the type of the track 3 and the type of the track 4 stored in the RAM 30; namely, whether each of the track 3 and the track 4 is a monaural type or a stereo type. Although a sound signal recorded in a monaural track can be replicated in a monaural track but not in a stereo track. Conversely, a sound signal recorded in a stereo track can be replicated to a stereo track but cannot be replicated to a monaural track. Incidentally, a sound signal recorded in a stereo track can be replicated to two monaural tracks that pair up with each other. Thus, given the fact that a combination of replicable tracks and a combination of tracks that cannot be replicated occur depending on track types, the CPU 32 displays only replicable tracks on the display section 24 as alternatives. Specifically, when the source track is selected, the CPU 32 accesses a table of track type information stored in the RAM 30 to identify whether or not the source track is a monaural type or a stereo type and determines an alternative for the destination track according to an identification result. An algorithm for determining alternatives for destination tracks is as follows.

(1) When a source track is of monaural type, a destination track is of monaural type.

(2) When a source track is of stereo type, a destination track is of stereo type or a pair of monaural-type tracks.

(3) When a source track is a pair of monaural-type tracks, a destination track is of stereo type. The pair of monaural-type tracks can also be included as a destination track. In particular, when a recorder includes a plurality of tracks, creation of a plurality of pairs of monaural tracks is feasible depending on specifications, and hence the plurality of pairs of monaural tracks are available.

It can also be construed that, since the track 3 and the track 4 can be set to either a monaural type or a stereo type, alternatives for a destination track can vary according to a setting status.

FIG. 7 shows possible combinations of source tracks with destination tracks achieved when the track 3 is set to a stereo type and when the track 4 is set to a monaural type.

When the source track (a source TR in the drawing) is the monaural track 1, the destination track (a destination TR in the drawing) must be of monaural type. Therefore, the destination track is limited to the track 2 or the track 4. The CPU 32 displays on the display section 24 the track 2 and the track 4 as alternatives for the destination track. Neither the track 1 nor the track 3 is displayed as alternatives. All the user has to do is to select either the track 2 or the track 4 and does not need to take into account the track 1 and the track 3, so that a user's choice is made simple. In the meantime, when the source track and the destination track are identical with each other, no replication can be performed. For this reason, displaying the track 1 is originally meaningless. It is, however, also possible to tentatively display the track 1 as an alternative. If the track 1 is selected, a predetermined error message can also be displayed. This is equivalent to substantial elimination of the track 1 from alternatives; namely, disabling selection of the track 1.

When the source track is the monaural track 2, the destination track must be of monaural type. Hence, the destination track is limited to the track 1 or the track 4. The CPU 32 displays on the display section 24 the track 1 and the track 4 as alternatives for a destination track.

When the source track is the stereo track 3, the destination track must be of stereo type. However, since there is no more stereo track, the destination track is limited to a pair of monaural tracks. In the drawing, a pair of monaural tracks is designated by reference symbol 1/2. The pair of monaural tracks 1/2 signifies that two monaural tracks 1 and 2 are handled as a single stereo track. The CPU 32 displays on the display section 24 the track 1/2 as an alternative for a destination track.

When the source track is the monaural track 4, a destination track must be of monaural type. For this reason, the destination track is limited to the track 1 or the track 2. The CPU 32 displays on the display section 24 the track 1 and the track 2 as alternatives for a destination track.

When the source track is the pair of tracks 1/2, a destination track must be of stereo type; therefore, the destination track is limited to the track 3. The CPU 32 displays on the display section 24 the track 3 as an alternative for a destination track.

FIG. 8 shows possible combinations of the source tracks with the destination tracks achieved when both the track 3 and the track 4 are set to stereo tracks.

When the source track is the track 1, a destination track must be of monaural type; therefore, the destination track is limited to the track 2. The CPU 32 displays on the display section 24 the track 2 as an alternative for a destination track.

When the source track is the track 2, a destination track must be of monaural type; therefore, the destination track is limited to the track 1. The CPU 32 displays on the display section 24 the track 1 as an alternative for a destination track.

When the source track is the track 3, a destination track must be of stereo type; therefore, the destination track is limited to the track 4 or the pair of monaural tracks 1/2. The CPU 32 displays on the display section 24 the track 4 and the pair of tracks 1/2 as alternatives for a destination track.

When the source track is the track 4, a destination track must be of stereo type; therefore, the destination track is limited to the track 3 or the pair of monaural tracks 1/2. The CPU 32 displays on the display section 24 the track 3 and the pair of tracks 1/2 as alternatives for a destination track.

When the source track is the pair of tracks 1/2, a destination track must be of stereo type; therefore, the destination track is limited to the track 3 or the track 4. The CPU 32 displays on the display section 24 the track 3 and the track 4 as alternatives for a destination track.

In the meantime, it is easily comprehended that, although unillustrated, possible combinations of source tracks with destination tracks that are achieved when the track 3 is set to a monaural track and when the track 4 is set to a stereo track are determined by easily replacing the destination TR 3 with the track 4 and the destination TR 4 with the track 3 in FIG. 7. The CPU 32 can store tables that define the combinations shown in FIGS. 7 and 8 into the RAM 30 and also display as alternatives for possible destination tracks conforming to source tracks by reference to the table.

As above, in the embodiment, the types of the tracks 1 through 4 are stored in the RAM 30. The CPU 32 automatically extracts only possible destination tracks conforming to types of selected source tracks and presents to the user the thus-selected tracks as alternatives for the destination tracks. Accordingly, the user does not have to go to the trouble of ascertaining types of the tracks 1 through 4 in each case and seeking possible tracks. The user can quickly, reliably set destination tracks and replicate source tracks.

Although the embodiment exemplifies the multitrack recorder having the track 1 through the track 4, the invention is not limited to this multitrack recorder. The invention can also be applied to a multitrack recorder having five tracks or more.

In the embodiment, the types of the tracks 3 and 4 or the types of all the tracks 1 through 4 are stored in the RAM 30. However, the track types can also be stored in nonvolatile memory, such as the flash ROM 28, and information about the track types can also be retained even after power of the multitrack recorder is turned off.

As shown in FIG. 6, in the embodiment, a number of a source track and a number of a destination track are displayed. When the source track is selected, numbers of tracks that are selectable as destination tracks are correspondingly displayed as alternatives. However, the display mode is not limited to this display. It is also possible to display numbers of destination tracks in the form of a list and highlight, as being selectable, numbers of only tracks in the list that are selectable in conformance with a type of a source track. Conversely, numbers of tracks that cannot be selected as destination tracks may also be displayed with symbol "x." In short, the essential requirement for the CPU 32 is to present to the user possible destination tracks in conformance with a type of a source track.

What is claimed is:

1. A multitrack recorder that records sound signals into a plurality of tracks, comprising:
    a setting section capable of setting at least some of the plurality of tracks to either a monaural track type or a stereo track type;
    storage configured to store the track type set by the setting section; and
    a controller configured to record the sound signal recorded in a source track to a destination track in a replicating manner and to present to a user a track conforming to a track type of the source track as a possible destination track by use of the track types stored in the storage.

2. The multitrack recorder according to claim 1, wherein the controller is configured to present a monaural track as a possible destination track when the source track is a monaural track and to present to a user a stereo track or a pair of monaural tracks as a possible destination track when the source track is a stereo track.

3. The multitrack recorder according to claim 2, wherein the controller is configured to present to a user a stereo track or a pair of monaural tracks as a possible destination track when the source track is a pair of monaural tracks.

4. The multitrack recorder of claim 1, further comprising a display on which the conforming track is presented.

\* \* \* \* \*